INVENTOR
D. W. GRANT
BY R. B. Ardis
ATTORNEY

MAGNETIC AMPLIFIER CIRCUITS

Filed June 28, 1955 2 Sheets-Sheet 2

INVENTOR
D. W. GRANT
BY R. B. Ardis
ATTORNEY

United States Patent Office 2,782,269
Patented Feb. 19, 1957

2,782,269

MAGNETIC AMPLIFIER CIRCUITS

Dwight W. Grant, Bedminster, N. J., assignor to Bell Telephone Laboratories, Incorporated, New York, N. Y., a corporation of New York Application June 28, 1955, Serial No. 518,487

12 Claims. (Cl. 179—171)

This invention relates generally to inductive control circuits and more particularly, although in its broader aspects not exclusively, to magnetic amplifier circuits which are operable over an extended band of audio frequencies.

A principal object of the invention is to make the input impedance of an inductive control device such as a magnetic amplifier substantially uniform over an extended frequency range in as simple a manner as possible.

A related object is to give a magnetic amplifier the maximum gain that can be obtained with uniformity over an extended band of signal frequencies.

Another object is to attenuate any carrier or carrier harmonic voltages which may appear in the control winding of a magnetic amplifier and prevent their appearance at an objectionable amplitude level in the signal source.

When such a magnetic control device as a magnetic amplifier is intended to operate over an extended range of signal frequencies, it is frequently desirable that both its input impedance and its gain be substantially constant over at least a major portion of that range. A magnetic amplifier, however, is essentially an inductive device and has an input impedance which is directly proportional to frequency. Not only does it tend to be difficult to incorporate a magnetic amplifier into a broad band system from an impedance-matching standpoint but the gain of the device is frequency-dependent. The output of a magnetic amplifier is proportional to signal current rather than to signal voltage and, as a result, gain tends to fall off with increasing frequency at a rate of approximately 6 db per octave.

In the past, when a magnetic amplifier has been used to provide amplification over an extended frequency range, one way of overcoming variations of impedance and gain with frequency has been to place a very large resistance in series with the magnetic amplifier input circuit. Variations in amplifier input impedance are thereby made negligible in comparison with the overall resistance of the circuit. Such an arrangement, however, is wasteful of signal power and greatly reduces gain. As an alternative, a past practice has been to flatten out the gain-frequency characteristic of a magnetic amplifier over the signal frequency band by either pre-equalization of the input signal or equalization in the output circuit. Such arrangements, however, require a considerable increase in the amount of circuitry and are particularly disadvantageous whenever space is at a premium and circuit simplicity is required.

The present invention overcomes both the input impedance and the gain variation problems which have been described without entailing either the power loss and gain reduction or the increase in circuit complexity encountered with the prior art arrangements. In addition, it accomplishes something not provided for by the prior art arrangements in the absence of additional circuitry: i. e., the attenuation of carrier and carrier harmonic voltages appearing in the magnetic amplifier control winding in order to prevent their transmission backwards into the signal source.

In accordance with a principal feature of the invention, the control winding of such a magnetic control device as a magnetic amplifier is itself connected as the interposed series arm of a four-terminal $\pi$-type filter network which is terminated, across one pair of terminals, by a resistor having a value substantially equal to the image impedance of the filter at one frequency in the signal range. Means is provided to couple a source of input signals, within the pass band of the filter in frequency, across the other pair of terminals of the filter network. The resulting arrangement not only presents an impedance to an input signal source which is substantially constant over the operating band of frequencies but also provides a magnetic amplifier gain which is substantially constant with frequency and which approaches the maximum that is theoretically possible with constant gain.

In one important aspect, the invention takes the form of an audio frequency magnetic amplifier circuit having a pair of capacitors connected from respectively opposite ends of the control winding to a point of reference potential (e. g., ground) and a terminating resistor connected across one of the capacitors. The capacitors form the shunt arms and the control winding the interposed series arm, respectively, of a $\pi$-type low-pass filter network, and the terminating resistor has a value substantially equal to the image impedance of the filter at zero frequency. In other aspects, the invention takes the form of a magnetic amplifier circuit having a pair of like capacitors connected from respectively opposite ends of the control winding to a point of reference potential, a third capacitor connected in series with the control winding between the pair of like capacitors, and a terminating resistor connected across one of the pair of like capacitors. In these forms of the invention the pair of like capacitors form shunt arms and the control winding and the third capacitor the interposed series arm, respectively, of a $\pi$-type band-pass filter network. The terminating resistor has a value substantially equal to the image impedance of the filter at a mid-band signal frequency. In all forms of the invention, the magnetic amplifier is complicated with a minimum of additional circuitry but is still provided with not only an input impedance that is resistive and substantially uniform over most of the signal band, but also with the maximum gain that is obtainable with uniformity over the frequency band of interest.

In addition to making the input resistance of a magnetic amplifier substantially uniform over an extended signal frequency range and increasing the gain, the present invention also helps eliminate carrier and carrier harmonic voltages from the control winding and prevent their appearance in any appreciable magnitude in the signal source. Past practice has been, where necessary, to provide separate filter circuits between the signal source and the magnetic amplifier input in order to eliminate such voltages. The present invention, by eliminating any necessity for such additional circuitry, thus further contributes to the simplicity of the magnetic amplifier circuit and its adaptability for use in installations where space is at a premium.

A more complete understanding of the invention may be obtained from a study of the following detailed description of several specific embodiments and their modes of operation. In the drawings.

Figure 1:
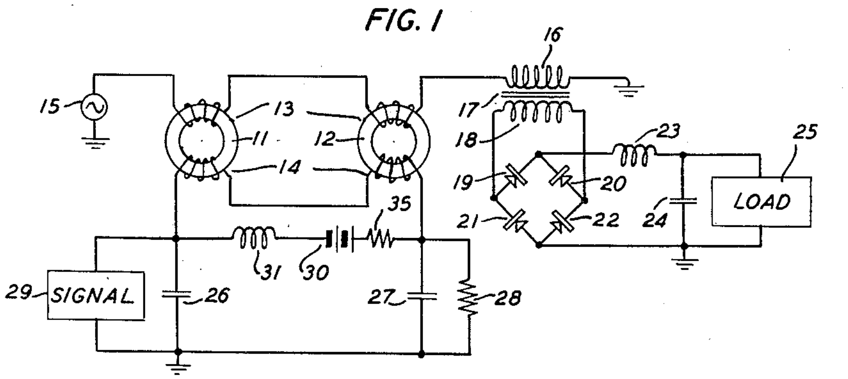
Fig. 1 illustrates a magnetic amplifier circuit embodying the invention, adapted for use over an extended range of audio frequencies.

The embodiment of the invention illustrated in Fig. 1 is composed of a saturable reactor having a pair of magnetic cores 11 and 12, a load winding 13, and a signal or control winding 14. As shown, each winding is wound half on one core and half on the other, with the windings on one core aiding with respect to the magnetic flux and the windings on the other opposed. In the simple series impedance type of magnetic amplifier shown, the carrier source 15 is coupled directly to load winding 13, rather than to a separate power winding, and is connected between one end of load winding 13 and ground. The primary winding 16 of an output transformer 17 is connected between the other end of load winding 13 and ground. By way of example, the frequency of carrier or power source 15 is selected to be at least twice the highest signal frequency.

Audio frequency signals are impressed across control winding 14 in the embodiment of the invention shown in Fig. 1 in a manner which will be described, resulting in output products in primary winding 16 of transformer 17 of carrier plus both upper and lower side bands. These output products are demodulated by a simple bridge rectifier connected across a secondary winding 18 of transformer 17. The rectifier is composed of a first pair of oppositely poled diodes 19 and 20 connected in series across secondary winding 18 and a second pair of oppositely poled diodes 21 and 22, oriented oppositely to the first pair, also connected in series across secondary winding 18. The diodes form a four-terminal rectifying bridge circuit having one pair of conjugate terminals connected to opposite ends of winding 18 and the other connected through a low-pass filter composed of a series inductor 23 and a shunt capacitor 24 to the load 25.

As has already been pointed out, the input impedance presented by signal or control winding 14 of the magnetic amplifier in Fig. 1 is predominantly inductive. Since the independent parameter controlling the carrier is signal current rather than signal voltage, the power input for a given degree of modulation increases directly with signal frequency and the useful gain decreases accordingly. To achieve a substantially flat transmission response over the entire signal band, it is therefore necessary either to equalize or provide a constant current drive. In the embodiment of the invention illustrated in Fig. 1, the latter is approximated by using the inductance of control winding 14 as the series element of a terminal $\pi$-type low-pass constant-$k$ filter having a cut-off frequency slightly above the highest signal frequency to be transmitted. A pair of like capacitors 26 and 27 are returned to ground from opposite ends of control winding 14, a terminating resistor 28 is connected across one capacitor 27, and the signal source 29 is connected across the other capacitor 26. Terminating resistor 28 has a value substantially equal to the image impedance of the filter at zero frequency and which is given by the equation:

$$R=\sqrt{\frac{L}{2C}} \qquad (1)$$

where R is the resistance of terminating resistor 28, L is the inductance of control winding 14 and C is the capacitance of each of like capacitors 26 and 27. Terminating resistor 28 is also given by the equation:

$$R=\pi f_c L \qquad (2)$$

where R and L are as defined above and $f_c$ is the cut-off frequency of the low-phase filter. In order to avoid doubling of the signal frequencies in the embodiment of the invention illustrated, a direct current bias is required in the control winding 14. This is provided by a source 30 of direct biasing voltage, a choke coil 31, and a resistor 35 connected in series directly across control winding 14.

Figure 1A:
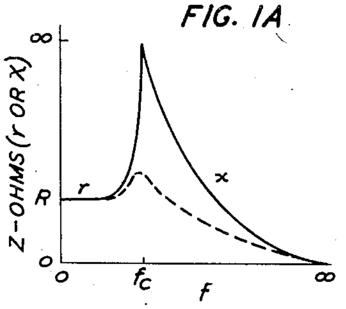
Fig. 1A is a curve showing the frequency characteristic of both the actual and theoretical input impedances of the embodiment of the invention illustrated in Fig. 1.

The frequency characteristic of the input impedance presented by the magnetic amplifier circuit in Fig. 1 to signal source 29 is shown in Fig. 1A, where the theoretical input impedance is represented by the solid line and the actual input impedance by the dash line. Below the cut-off frequency $f_c$, the input impedance is largely resistive and equal in magnitude to the terminating resistor 28. Above $f_c$, the input impedance is largely reactive.

In the embodiment of the invention illustrated in Fig. 1, the cut-off frequency $f_c$ of the low-pass filter is located above the top of the desired audio frequency signal band. As shown in Fig. 1A, the input impedance of the magnetic amplifier circuit is thereby maintained as a substantially constant low resistance over by far the major portion of the signal band. Since, as has already been explained, the magnetic amplifier carrier output amplitude depends upon signal current rather than signal voltage, overall gain is also held substantially constant over the same portion of the signal band. The slight increase in input resistance at the top of the band is due to interaction between the inductance of control winding 14 and capacitors 26 and 27. It is accompanied by a slight increase in gain which actually tends to be advantageous, since it overequalizes the output at the higher signal frequencies and offsets, to some extent, the inherent droop in the characteristics of the demodulation filter. Finally, it is to be noted that capacitors 26 and 27 of the $\pi$-type filter section provide an effective bypass for the even harmonics of the carrier which inherently tend to appear in the signal or control winding of this type of magnetic amplifier.

Figure 1B:
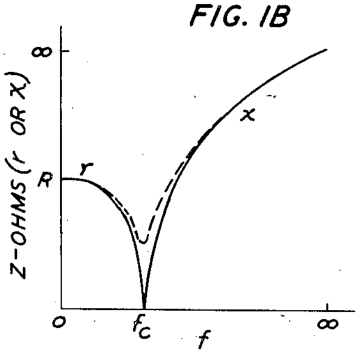
Fig. 1B is a curve showing the frequency characteristic of the actual and theoretical input impedances of another possible magnetic amplifier circuit arrangement, emphasizing the advantages realized by virtue of application of the present invention.

The high level of gain made possible by the present invention is due to the low input impedance obtained with a given winding in the circuit illustrated. If the control winding is used without external circuitry, the impedance at the highest frequency of interest is $2\pi f_{max}L$, and this impedance determines the sensitivity or gain to which the gain at all other frequencies must be equalized. If the winding inductance is made the series arm of a half-section filter, the impedance becomes a resistance equal to $2\pi f_c L$ *or* $2\pi f_{max} L$ if $f_c$ is equal to $f_{max}$. Fig. 1B depicts, in the solid and dashed curves, respectively, the theoretical and actual impedance presented by such a half-section filter.

In accordance with the present invention, the winding inductance is used as the series arm of a full $\pi$ section of filter, making the impedance a resistance substantially equal to $\pi f_c L$, which is one half the impedance of either of the other two arrangements mentioned in the preceding paragraph. This is the minimum impedance with uniformity over a wide frequency range. Since, as mentioned earlier, the gain of a magnetic amplifier is an inverse function of the input impedance for a given winding, this minimum impedance corresponds to the maximum gain obtainable over the frequency band of interest.

Figure 2:
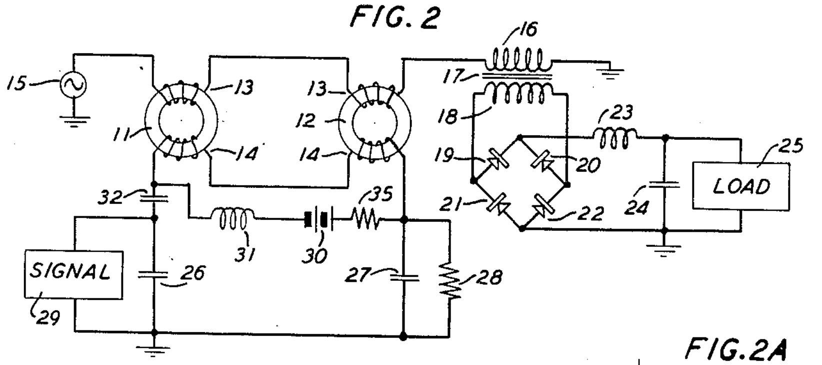
Fig. 2 illustrates a magnetic amplifier circuit embodying the invention, adapted for use over an extended range of frequencies somewhat higher in the frequency spectrum than the operating band for the arrangement of Fig. 1.

Fig. 2 shows an embodiment of the invention which is adapted for operation over a somewhat different band of frequencies. The magnetic amplifier circuit illustrated is substantially the same as that shown in Fig. 1, the difference being that a capacitor 32 has been added in series with magnetic amplifier control winding 14 in the path between the two like capacitors 26 and 27.

Control winding 14 and capacitor 32 thus form the interposed series arm and capacitors 26 and 27 the shunt arms, respectively, of a $\pi$-type band-pass filter network of the constant-$k$ variety. The pass band of the filter is arranged to encompass the band of signal frequencies supplied by signal source 29, and terminating resistor 28 has a value substantially equal to the image impedance of the filter network at a mid-band signal frequency. The value of terminating resistor 28 is given by the equation:

$$R=\pi(f_2-f_1)L \qquad (3)$$

where R and L are as defined in connection with Equations 1 and 2, $f_1$ is the low cut-off frequency of the filter, and $f_2$ is the high cut-off frequency of the filter.

Figure 2A:
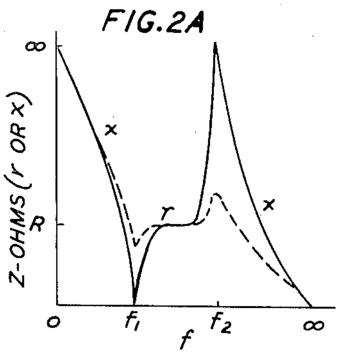
Fig. 2A shows the frequency characteristic of the actual and theoretical input impedances of the embodiment of the invention illustrated in Fig. 2.

The manner in which the input impedance presented to signal source 29 varies with frequency in the embodiment of the invention shown in Fig. 2 is illustrated in Fig. 2A. As in Figs. 1A and 1B, the theoretical input impedance is represented by the solid line and the actual input impedance by the dashed line. As shown, the input impedance is resistive between the high and low filter cut-off frequencies $f_2$ and $f_1$ and is maintained at the substantially constant minimum level described above. The gain of the amplifier is thereby also maintained substantially constant over the frequency band of interest at the substantially maximum level. In addition, as in the embodiment of the invention shown in Fig. 1, the capacitors of the filter network attenuate any carrier and carrier harmonic voltages that may appear in control winding 14 and prevent their transmission backwards into signal source 29.

The embodiment of the invention depicted in Fig. 2, in which control winding 14 is utilized with an additional series capacitor as the interposed series arm of a $\pi$-type band-pass filter network, is particularly suitable for use at frequencies above the audio range. If signal source 29, for example, were to represent a source of carrier frequencies, the magnetic amplifier shown would be particularly advantageous, bringing to extended frequency bands above the audio range the advantages provided at audio frequencies by the circuit shown in Fig. 1.

Figure 3:
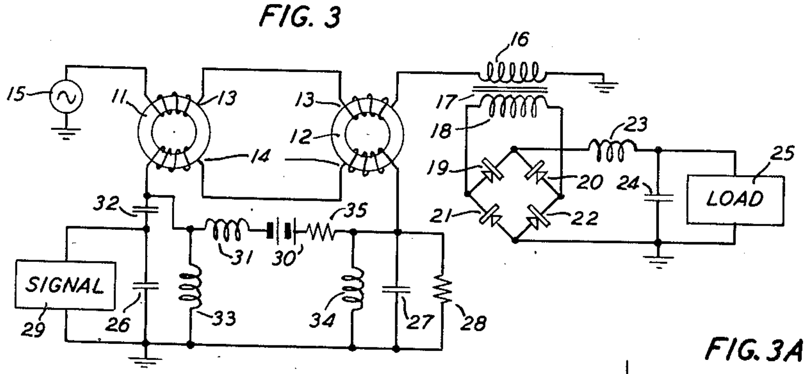
Fig. 3 shows another magnetic amplifier circuit embodying the invention which is a variation of that illustrated in Fig. 2.

A variation of the embodiment of the invention illustrated in Fig. 2 is shown in Fig. 3. The magnetic amplifier circuit is the same as that shown in Fig. 2 except that a pair of inductors 33 and 34 are connected parallel with capacitors 26 and 27 respectively. In Fig. 3, the parallel combination of capacitor 26 and inductor 33 forms one shunt arm, the parallel combination of capacitor 27 and inductor 34 forms the other shunt arm, and the series combination of control winding 14 and capacitor 32 forms the interposed series arm of a $\pi$-type band-pass filter network of the constant-$k$ variety. The terminating resistor 28 has a value equal to the image impedance of the filter at a mid-band frequency and, as in Fig. 2, is given by the equation:

$$R=\pi(f_2-f_1)L$$

The embodiment of the invention depicted in Fig. 3 (as is the one shown in Fig. 2) is particularly well suited for use in amplifying a band of carrier frequencies. The various advantages which have been outlined in connection with Figs. 1 and 2 are also secured.

Figure 3A:
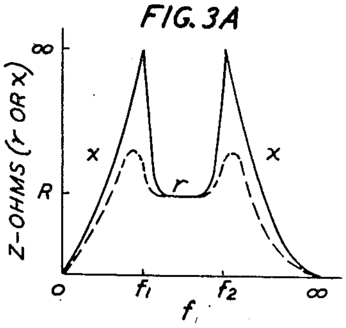
Fig. 3A is a curve showing the frequency characteristic of the actual and theoretical input impedances of the embodiment of the invention shown in Fig. 3.

The frequency characteristic of the input impedance presented by the circuit arrangement of Fig. 3 is shown in Fig. 3A, where, as before, the theoretical input impedance is represented by the solid curve and the actual input impedance by the dashed curve. The input impedance is substantially resistive between the high and low filter cut-off frequencies and is maintained at a substantially constant low level. The frequency characteristic shown in Fig. 3A differs, however, from that shown in Fig. 2A in that the one shown in Fig. 3A is substantially symmetrical about a selected mid-band signal frequency. As illustrated, the slight change in input resistance at the top and bottom edges of the signal band is in the same direction rather than in the opposite direction. In some installations, the additional convenience of such a symmetrical impedance characteristic may well be found to warrant the two additional circuit elements used in the arrangement of Fig. 3, i. e., inductors 33 and 34.

It is to be understood that the above-described arrangements are illustrative of the application of the principles of the invention. Numerous other arrangements, applicable to any magnetic amplifier, modulator, or related device in which the output is controlled by current through an inductance, may be devised by those skilled in the art without departing from the spirit and scope of the invention.

What is claimed is:

1. A magnetic amplifier circuit which comprises a saturable reactor having at least a load winding and a control winding, a pair of capacitors connected from respectively opposite ends of said control winding to a point of reference potential, said control winding and said capacitors forming a $\pi$-type filter network having a predetermined pass band, a terminating resistor connected across one of said capacitors having a value substantially equal to the image impedance of said filter network at one frequency in its said pass band, and means to connect a source of signals within said pass band in frequency across the other of said capacitors, whereby the gain of said magnetic amplifier is both increased substantially and maintained substantially constant over at least a major portion of the signal frequency range.

2. A magnetic amplifier circuit which comprises a saturable reactor having at least a load winding and a control winding, a pair of like capacitors connected from respectively opposite ends of said control winding to a point of reference potential, said capacitors forming the shunt arms and said control winding forming the interposed series arm of a $\pi$-type low-pass filter network, a terminating resistor connected across one of said capacitors and having a value substantially equal to the image impedance of said filter network at zero frequency, and means to connect a source of signals below the cut-off frequency of said filter network in frequency across the other of said capacitors, whereby the input resistance presented to a signal source by the magnetic amplifier at said connection means is both substantially reduced and maintained substantially constant over at least a major portion of the signal frequency range.

3. A magnetic amplifier circuit in accordance with claim 2 in which the value of said terminating resistor is substantially equal to the $$\sqrt{\frac{L}{2C}}$$

where L is the inductance of said control winding and C is the capacitance of each of said capacitors.

4. A magnetic amplifier circuit in accordance with claim 2 in which the value of said terminating resistor is substantially equal to $\pi f_c L$, where L is the inductance of said control winding and $f_c$ is the cut-off frequency of said low-pass filter network.

5. A magnetic amplifier circuit which comprises a saturable reactor having at least a load winding and a control winding, a pair of like capacitors connected from respectively opposite ends of said control winding to a point of reference potential, a third capacitor connected in series with said control winding in a path between said pair of like capacitors, said pair of like capacitors forming the shunt arms and said control winding and said third capacitor forming the interposed series arm of a $\pi$-type band-pass filter network, a terminating resistor connected across one of said pair of like capacitors having a value substantially equal to the image impedance of said filter network at a mid-band signal frequency, and means to connect a source of signals within the pass band of said filter network in frequency across the other of said pair of like capacitors, whereby the input resistance presented to a signal source by the magnetic amplifier at said connection means is both substantially reduced and maintained substantially constant over at least a major portion of the signal frequency range.

6. A magnetic amplifier circuit in accordance with claim 5 in which the value of said terminating resistor is substantially equal to $\pi(f_2-f_1)L$, where L is the inductance of said control winding, $f_2$ is the high cut-off frequency of said filter network, and $f_1$ is the low cut-off frequency of said filter network.

7. A magnetic amplifier circuit in accordance with claim 5 which includes a pair of like inductors, each connected across a respective one of said first pair of capacitors.

8. A magnetic amplifier circuit in accordance with claim 5 which includes a pair of like inductors, each connected across a respective one of said first pair of capacitors and in which the value of said terminating resistor is substantially equal to $\pi(f_2-f_1)L$, where L is the inductance of said control winding, $f_2$ is the high cut-off frequency of said filter network, and $f_1$ is the low cut-off frequency of said filter network.

9. A magnetic amplifier circuit which comprises a saturable reactor having at least a load winding and a control winding, a four-terminal $\pi$-type filter network having a pair of shunt arms and an interposed series arm which includes said control winding, a terminating resistor connected across one pair of filter terminals having a value substantially equal to the image impedance of said filter network at one frequency in the pass band thereof, and means to connect a source of signals within the pass band of said filter network in frequency across the other pair of filter terminals, whereby the gain of the magnetic amplifier is both increased substantially and maintained substantially constant over at least a major portion of the signal frequency range and frequencies outside the pass band of said filter network are blocked from transmission backward into any connected signal source.

10. In combination, a current-operated magnetic device which includes at least one control winding and means to increase the sensitivity of said device to a maximum value over a predetermined range of frequencies which comprises a pair of like capacitors connected from respectively opposite ends of said control winding to a point of reference potential, a resistor having a value of substantially $$\sqrt{\frac{L}{2C}}$$

connected across one of said capacitors, where L is the inductance of said control winding and C is the capacitance of each of said capacitors, and means to couple a source of control signals for said device across the other of said capacitors.

11. A magnetic amplifier circuit which comprises a saturable reactor having at least a load winding and a control winding, a four-terminal $\pi$-type filter network having a pair of shunt arms and an interposed series arm which includes said control winding, terminating means having an impedance substantially equal to the image impedance of said filter network at one frequency in the pass band thereof connected across one pair of filter terminals, and means to connect a source of signals within the pass band of said filter network in frequency across the other pair of filter terminals, whereby the gain of the magnetic amplifier is both increased substantially and maintained substantially constant over at least a major portion of the signal frequency range and frequencies outside of the pass band of said filter network are blocked from transmission backward to any connected signal source.

12. A magnetic amplifier circuit which comprises a saturable reactor having at least a load winding and a control winding, a four-terminal $\pi$-type bandpass filter network having a pair of shunt arms and an interposed series arm which includes said control winding, and means to connect a source of signals within the pass band of said filter network in frequency across one pair of filter terminals, whereby the gain of the magnetic amplifier is both increased substantially and maintained substantially constant over at least a major portion of the signal frequency range.

References Cited in the file of this patent

UNITED STATES PATENTS

| | | |
|---|---|---|
| 1,624,682 | Shea | Apr. 12, 1927 |
| 1,884,844 | Peterson | Oct. 25, 1932 |
| 2,650,350 | Heath | Aug. 25, 1953 |
| 2,653,282 | Darling | Sept. 22, 1953 |